Sept. 3, 1968
D. L. McKAY
3,399,996
CONTINUOUSLY LAGERING A FERMENTED BEVERAGE UNDER HIGH PRESSURE
Filed Nov. 2, 1964
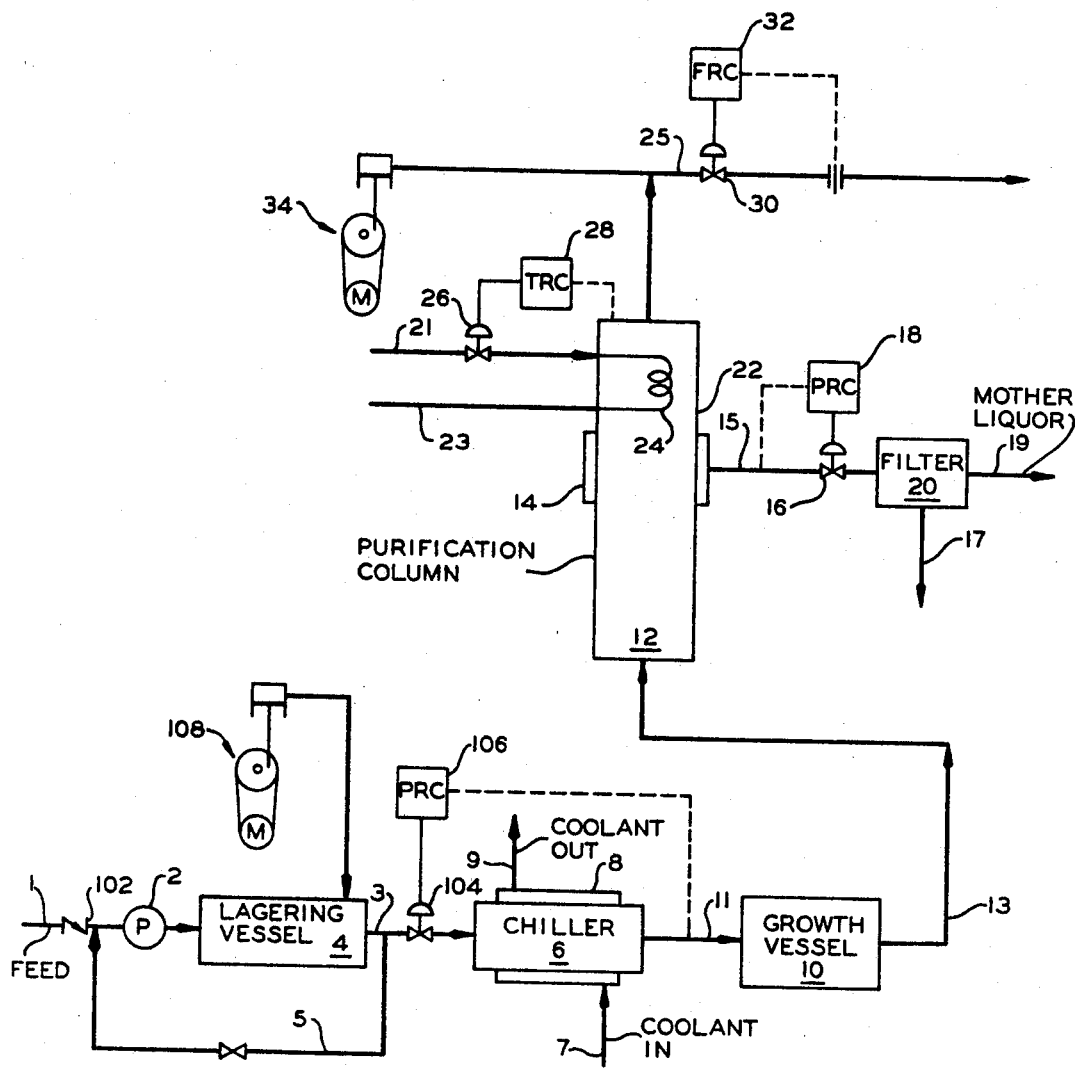
INVENTOR
D.L. McKAY
BY Young & Quigg
ATTORNEYS 3,399,996
CONTINUOUSLY LAGERING A FERMENTED BEVERAGE UNDER HIGH PRESSURE
Dwight L. McKay, Bartlesville, Okla., assignor to Phillips Petroleum Company, a corporation of Delaware
Filed Nov. 2, 1964, Ser. No. 408,102
6 Claims. (Cl. 99—48)

ABSTRACT OF THE DISCLOSURE

A fermented beverage is continuously lagered above the freezing point thereof and at a pressure in the range of 100 to 30,000 p.s.i.g. A portion of the lagered beverage is recycled while the remainder is chilled to produce a slurry of ice crystals and concentrated beverage. The concentrated beverage is separated from the ice crystals and filtered.

---

This invention relates to the processing of fermented beverages.

In the production of beverages by fermentation, turbidity-producing compounds such as the complex proteins and tannins are formed which must be removed from the beverage prior to packaging to prevent the presence of cloudiness and precipitates in the beverage when cooled and ready to be consumed. The removal of such compounds is generally accomplished by storing and aging at low temperatures for a considerable length of time, which is termed lagering. The lagering requires a considerable amount of tankage for storing the beverage and a time of several weeks for the process to be completed. It is known that the lagering time can be accelerated by reducing the temperatures of the beverage so that a portion of the water present is crystallized. The cooling facilitates sedimentation of the turbidity-producing compounds as well as concentrating the beverage. The lagering step is one of the important phases of fermented beverage production as it enhances the flavor, aroma and taste of the beer. The conventional lagering process requires such beverage production to be batch and requires a large quantity of expensive storage space, cooling, and time for aging. The recent lagering by freezing has accelerated the time and reduced storage facilities but the degree of sedimentation is dependent upon the temperature employed. Thus as the cooling temperature is varied the beverage quality varies.

Accordingly, it is an object of this invention to provide a continuous process for producing fermented beverages as concentrates.

It is another object of this invention to provide for the continuous lagering of fermented beverages.

It is still another object of this invention to provide flexibility in crystallization concentration of fermented beverages.

Other objects, aspects, and advantages of the invention will become apparent to one skilled in the art upon further study of this disclosure, the drawing, and appended claims.

In accordance with this invention a fermented beverage is rapidly and continuously lagered by passing it through a confined zone maintained under pressure. Pressures in the range of 100 to 30,000 p.s.i.g. will generally be employed. The confined zone may be held under a constant pressure or subjected to pulsating or intermittent pressure. The thus lagered beverage may be further lagered and concentrated by subjecting it to a reduced temperature for crystallization of a portion of the water followed by crystal purification and removal. Alternatively, the fermented beverage may be initially lagered and concentrated by subjecting it to the low temperature operation and then the recovered concentrated beverage further lagered by passing it through a pressure zone.

It is believed that to some extent different turbidity-producing compounds are caused to precipitate when a beverage is subjected to reduced temperatures or to increased pressures. Also, lagering by reduced temperature is believed to distract to some extent from the beverage quality by removing a portion of the aroma and flavor constituents. Thus, to concentrate the beverage at temperatures which do not remove the desired constituents fails to remove all of the undesirable constituents. Thus, is is necessary to use other methods for complete beverage lagering.

A more complete understanding of this invention can be had by the following detailed description with reference to the drawing which is a diagrammatic view of suitable process apparatus.

Referring now to the drawing a fermented beverage is introduced through conduit 1 and pump 2 to lagering vessel 4. Vessel 4 is maintained under pressure by any suitable means; such as pressure supplied by pump 2, back pressure from subsequent operations, or by direct pressuring means. Lagered beverage is removed from vessel 4 through conduit 3 and introduced into chiller 6. Conduit 5 communicates with conduit 3 and conduit 1 upstream of pump 2 for recycle of a portion of the lagered beverage. Check valve 102 prevents the recycle material from back flowing in conduit 1. Chiller 6 has surrounding jacket 8 with inlet 7 and outlet 9 for passing a cooling medium therethrough to adjust the temperature in chiller 6. The temperature can also be adjusted by directly introducing an inert refrigerant to the beverage in chiller 6. If such direct cooling is employed, recovery equipment for the refrigerant, such as propane, will be employed at the chiller exit. A slurry of ice crystals and beverage is removed from chiller 6 through conduit 11 and introduced into crystal growth vessel 10. Slurry is removed from vessel 10 and introduced into crystal purification column 12 via conduit 13. In column 12, the crystals are initially compacted into a bed which passes to a filter zone 14 having an outlet conduit 15 for the concentrated beverage (mother liquor). The quantity of mother liquor withdrawn is controlled by valve 16 in conduit 15 manipulated by pressure recorder controller 18 operatively connected to conduit 15 for maintaining a desired pressure drop in column 12. The withdrawn mother liquor is passed to a filter zone 20 for removal of the sediments via conduit 17 and recovery of concentrated beverage via conduit 19 suitable for bottling or packaging. The ice bed passes through filter zone 14 and into reflux and melt zone 22. Melt zone 22 is equipped with suitable heating means, such as heat exchange coil 24, as shown, having inlet conduit 21 connected to a source of heat exchange medium, not shown, and outlet conduit 23. The temperature in melt zone 22 is regulated by controlling the flow of medium in conduit 21 by manipulating valve 26 in response to temperature recorder controller 28 operatively connected to melt zone 22. Purified water is withdrawn from melt zone 22 through conduit 25. The rate of water withdrawn is controlled by valve 30 in conduit 25 manipulated by flow recorder controller 32 operatively connected to conduit 25. Reflux of the ice bed in melt zone 22 with purified water is effected by a pulse unit 34 connected to conduit 25.

If desired, a filter can be employed in conduit 3 to remove the sediments caused by lagering prior to chilling the beverage in chiller 6. As thus described, a pulsating pressure will be maintained in vessel 4 caused by pulse unit 34. The pressure will vary from the pressure created by pump 2, about 130 p.s.i.g., to about 500 p.s.i.g. caused by pulse unit 34. As a first alternative, valve 104 is placed in conduits 3, and vessel 4 is pressurized directly at a constant pressure by compression or by introducing a gaseous material, such as $CO_2$ which will carbonate the beverage or an inert gas such as nitrogen. When using this alternative procedure, the flow of beverage to and from vessel 4 is controlled by manipulating valve 104 in response to pressure recorder controller 106 operatively connected to conduit 11 to maintain a desired pressure in chiller 6. As a second alternative, vessel 4 is subjected to intermittent increased pressure by pulse unit 108 operatively connected to vessel 4. In this procedure, previously described, valve 104 and controller 106 will be employed. As a third alternative, fermented beverage can be introduced directly into chiller 6 and concentrated as described above. In this procedure, filter zone 20, as shown, would be modified so that it could be pressurized in the manner previously described for vessel 4 to effect pressurized lagering of the beverage concentrate (mother liquor). Furthermore, the lagered beverage in conduit 3 may be filtered, bottled and packaged, if concentrating is not desired.

Example

In three separate runs, fermented beer containing 3.6 weight percent alcohol at a temperature of 40° F. is pumped at a rate of 500 gallons per hour at 130 p.s.i.g. pressure into lagering vessel 4. Vessel 4 is pressurized differently in each run as later described. The beverage is allowed a 15-minute residence time in vessel 4. Beer from vessel 4 is introduced directly to chiller 6 with 500 gallons per hour being recycled to vessel 4. Chiller 6 is cooled by passing ammonia through jacket 8 to reduce the beer temperature to 25° F. The slurry of beer and ice from chiller 6 is introduced into growth vessel 10 where it is maintained for 1 hour. Slurry containing 45.7 weight percent ice at 25.4° F. is removed from vessel 10 and introduced into column 12. Column 12 is pulsed by unit 34 operating at 240 cycles per minute. Concentrated beer containing 6.61 weight percent alcohol at 25.4° F. is withdrawn as mother liquor at a rate of 271 gallons per hour. Purified water containing 0.07 weight percent alcohol at 60° F. is withdrawn at a rate of 229 gallons per hour.

In Run 1, vessel 4 is subjected to a pulsating pressure varying from 130 to 500 p.s.i.g. caused by pulse unit 34.

In Run 2, vessel 4 is subjected to a constant pressure of 7500 p.s.i.g.

In Run 3, vessel 4 is subjected to an intermittently applied pressure of 7500 p.s.i.g. caused by operating pulse unit 108 on for 2 minutes and off for ½ minute.

The concentrated beer in all three runs is lagered sufficiently for reconstitution and bottling. The resulting beverage retains the natural aroma and flavor. The degree of lagering accomplished and the aroma and flavor retained in these runs are greater than would be obtained when the pressurizing steps are omitted.

In another run, the 500 gallons per hour of fermented beer is introduced directly into chiller 6 by-passing vessel 4. The 271 gallons per hour of mother liquor is subjected to an intermittent pressure of 7500 p.s.i.g. caused by a pulse unit operating as described for Run 3 above. The resulting concentrated beer is sufficiently lagered to prevent sedimentation when reconstituted, bottled and cooled. The beverage is better lagered in this run than would be obtained without the use of the increased pressure.

Although this example has been directed to beer, it is to be understood that any fermented beverage is equally applicable to this invention.

Reasonable variations and modifications of this invention will be apparent to one skilled in the art without departing from the invention described.

That which is claimed is:

1. A process for continuously lagering an aqueous fermented beverage which comprises passing said beverage into a lagering zone, maintaining the beverage in said lagering zone at a temperature of approximately 40° F. under a pressure in the range of 100 to 30,000 p.s.i.g., withdrawing from said lagering zone as the only effluent therefrom a lagered stream having the same composition as said beverage, recycling a first portion of said lagered stream directly to said lagering zone as a portion of the feed thereto, passing the remainder of said lagered stream to a chilling zone, subjecting said remainder of said lagered stream in said chilling zone to a reduced temperature to crystallize at least a portion but not all of the water therein to produce a slurry of ice crystals in concentrated beverage, varying the rate of flow of said remainder of said lagered stream into said chilling zone responsive to the pressure of said slurry in said chilling zone to maintain the pressure of said slurry in said chilling zone substantially constant at a desired value, separating said crystals from said concentrated beverage, recovering said concentrated beverage, and filtering the thus recovered concentrated beverage.

2. A process in accordance with claim 1 wherein said fermented beverage is beer.

3. A process in accordance with claim 2 wherein the pressure in said lagering zone is maintained at about 7500 p.s.i.g.

4. A process in accordance with claim 2 which further comprises applying a series of pressure pulses directly to the beverage in said lagering zone.

5. A process in accordance with claim 4 wherein said series of pulses is produced by cyclically applying pressure for about two minutes and removing the thus applied pressure for about one-half minute.

6. A process in accordance with claim 5 wherein said applied pressure is approximately 7500 p.s.i.g.

References Cited

UNITED STATES PATENTS

| 2,815,288 | 12/1957 | McKay | 99—205 |
| 3,128,188 | 4/1964 | McIntire | 99—48 |
| 3,240,025 | 3/1966 | Malick et al. | 99—49 X |

ALVIN E. TANENHOLTZ, *Primary Examiner.*

D. M. NAFF, *Assistant Examiner.*